United States Patent Office 3,433,876
Patented Mar. 18, 1969

3,433,876
FUNGICIDAL COMPOSITION CONTAINING 3a,4,7,7a - TETRAHYDRO - 2,3,3a,4,5,6,7,7a-OCTAHALO - 4,7 - METHANOINDENE 1,8-DIONE DIIMINE AND METHOD OF USING THE SAME
Earl T. McBee, Lafayettte, Ind., assignor to Purdue Research Foundation, West Lafayette, Ind., a corporation of Indiana
No Drawing. Original application Dec. 16, 1963, Ser. No. 330,603, now Patent No. 3,320,316, dated May 16, 1967. Divided and this application Nov. 23, 1966, Ser. No. 619,082
U.S. Cl. 424—325  8 Claims
Int. Cl. A01n 9/20

ABSTRACT OF THE DISCLOSURE

A method for controlling fungi that comprises applying to the locus to be treated an effective amount of 3a,4,7,7a-tetrahydro-2,3,3a,4,5,6,7,7a - octahalo - 4,7 - methanoindene-1,8-dione diimine. Also described is a fungicidal composition containing the active ingredient mentioned.

---

This is a division of my patent application identified by United States Ser. No. 330,603, filed Dec. 16, 1963, now U.S. Patent 3,320,316 which is a continuation-in-part of my application Ser. No. 98,031, filed Mar. 24, 1961, now abandoned.

This invention relates to 3a,4,7,7a-tetrahydro-2,3,3a,4, 5,6,7,7a - octahalo - 4,7 - methanoindene - 1,8 - dione diimines and to a process for their production.

The invention sought to be patented, in its composition aspect, resides in the concept of the chemical compounds 3a,4,7,7a-tetrahydro - 2,3,3a,4,5,6,7,7a - octahalo - 4,7-methanoindene-1,8-dione diimine wherein halo is chloro or bromo.

The invention sought to be patented, in its process aspect, resides in the concept of embodying such a compound in tangible form by contacting hexabromocyclopentadiene or hexachlorocyclopentadiene with liquid ammonia at a temperature below the boiling point of ammonia.

A tangible embodiment of this invention, 3a,4,7,7a-tetrahydro - 2,3,3a,4,5,6,7,7a - octachloro - 4,7 - methanoindene-1,8-dione diimine as its monohydrate is a white crystalline compound melting just above 200 degrees centigrade. It and the corresponding octabromo compound are useful as chemical intermediates because of the highly reactive imino groups and the active halogens, each useful in producing a wide variety of useful products by reaction with appropriate reagents, e.g., reducing agents to convert the imino groups to amines, and are useful in the control of fungus diseases of plants, i.e., the limitation of the adverse effects of and the prevention of fungal diseases in useful commercial crop plants, especially fructiferous plants and trees.

The compounds of this invention are prepared by the reaction of hexabromocyclopentadiene or hexachlorocyclopentadiene with ammonia according to the over-all reaction illustrated below with the chloro compound.

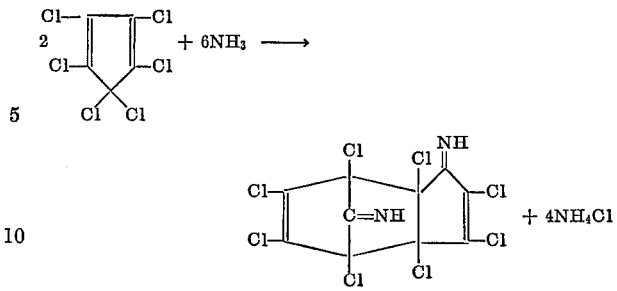

According to the process of this invention, hexabromocyclopentadiene or hexachlorocyclopentadiene and liquid ammonia are allowed to remain in contact with each other for a period of time, preferably at least several hours and preferably at a temperature below the boiling point of liquid ammonia, i.e., minus 33 degrees centigrade, e.g., to −70° C. or lower. If a temperature above −33° C. is desired, pressure equipment can be employed. Improved yields are obtained when the reactants are stirred and when the ammonia is present in excess of the stoichiometric amount required, i.e., more than three moles of ammonia per mole of hexahalocyclopentadiene, and preferably a large molar excess. The reaction mixture is most conveniently worked up by allowing it to warm gradually to room temperature, thereby evaporating the excess ammonia. The product is conveniently isolated from the residue, which also contains unreacted hexahalocyclopentadiene, by crystallization from solution in a solvent, e.g., a low boiling hydrocarbon.

An advantage of the products of this invention is that they can be utilized for fungicidal use in a variety of formulations. For example, the purified or crude products can be combined with biocides or pesticides, including insecticides, such as DDT, methoxychlor, lindane, aldin, endrin, DDD, BHC, parathion, malathion, methyl parathion, lead arsenate, calcium arsenate, rotenone, allethrin, pyrethrum, nicotine, summer oils, dormant oils, dinitroalkylphenols, dinitrocresols, chlordane, heptachlor, insecticidal carbamates and organophosphates, chlorinated terpenes, dimeton, thiophosphates and dithiophosphates, such as O,O-dimethyl-S-oxo-1,2,3-benzotriazin - 3(4H)-ylmethylphosphorodithioate; (O,O - diethyl - O(2 - isopropyl-6-methyl - 4 - pyrimidinyl)phosphorothioate); the composition marketed under the trademark "Dibrom," etc., miticides, such as bis(pentachlorocyclopentadienyl), chlorinated arysulfonates, chlorinated diarylsulfones and the like, other fungicides, such as sulfur, dithiocarbamates and N-trichloromethylthio-4-cyclohexene-1,2-dicarboximide, to list but a few, to produce formulations having a combined effect.

It is desirable when combining the products of this invention with insecticidal products to include also a class of potentiators or synergists known in the insecticidal art as "knockdown agents." These substances are insecticides which when combined with other insecticides will shorten the time required, or reduce the amounts of the insecticide necessary to effect total immobilization (knockdown) or death of the insect to be controlled. Among the large number of synergists which can be used for this purpose are the organic thiocyanates and the water soluble organophosphates, such as phosdrin, and (2,3,4-methylenedioxyphenoxy)-3,6,9-trioxaundecane, to name but a few.

Another advantage of the inventive compositions is that they can readily be formulated as solids or liquids, using solid or liquid solvent vehicles, carriers or extenders.

Suitable diluents are solids or liquids of an inert nature. Illustrative solid diluents include among many others: sawdust, clay, talos, flours, silicas, alkaline earth carbonates, oxides and phosphates, sulfur and the like.

Suitable solvents for liquid formulations include water, ketones, alcohols, aromatic and aliphatic hydrocarbons and petroleum fractions or distillates.

Whether dissolved or dispersed, suspended or emulsified in a liquid or formulated as a dust or powder or some other solid preparation, the fungicides of this invention can advantageously contain one or more substances known or referred to variously as modifiers, wetting agents, surface active agents, etc.

This invention is further illustrated by the following examples:

Hexachlorocyclopentadiene (27.3 grams, 0.1 mole) was added to liquid ammonia (17 grams, 1.0 mole), at −70 degrees centigrade. The resultant suspension was stirred for 2 days at that temperature and then permitted to warm slowly to room temperature. The residue was dissolved in ether and the ether solution washed with water. After drying over calcium sulfate, the ether was evaporated to give a yellow liquid. On addition of pentane, a solid separated which was filtered and recrystallized from ether-pentane to give 3 grams of colorless 3a,4,7,7a - tetrahydro - 2,3,3a,4,5,6,7,7a - octachloro-4,7-methanoindene-1,8-dione diimine monohydrate melting at 204 degrees centigrade.

*Analysis.*—Calc'd for $(C_5Cl_4NH)_2H_2O$: C, 26.55; H, 0.89; N, 6.19; Cl, 62.89; M.W., 452. Found: C, 26.34; H, 0.95; N, 6.29; Cl, 62.50; M.W. 437.

Further drying, e.g., at slightly elevated temperatures at reduced pressure in a vacuum desiccator, converts the monohydrate to the anhydrous compound 3a,4,7,7a-tetrahydro - 2,3,3a,4,5,6,7,7a - octachloro-4,7-methanoindene-1,8-dione diimine.

Distillation of the mother liquors yielded 21 grams or a 77 percent recovery of hexachlorocyclopentadiene. Based on the amount of hexachlorocyclopentadiene reacted, the yield of product was 66 percent.

Following the above procedure, but substituting hexabromocyclopentadiene for the hexachlorocyclopentadiene, there is produced 3a,4,7,7a-tetrahydro-2,3,3a,4,5,6,7,7a-octabromo-4,7-methanoindene-1,8-dione diimine.

Tomato plants inoculated with spores of early blight and late blight disease were sprayed with aqueous dispersions of the compound of the above example (HBT 1578), at various concentrations, and held until disease symptoms were evident in similarly inoculated but unsprayed comparison plants. The disease controls on the sprayed plants were as follows:

| Compound sprayed | Percent control at concentration (p.p.m.) | | | |
|---|---|---|---|---|
| | 200 | 100 | 50 | 25 |
| Early blight test: | | | | |
| HBT 1578, percent | 100 | 89 | 85 | 33 |
| Control: 301 spots | | | | |
| Late blight test: | | | | |
| HBT 1578, percent | 100 | 100 | 100 | 83 |
| Control: 300 spots | | | | |

Comparable results are obtained when the octabromo compound is substituted for the octachloro compound as the fungicide.

Various modifications of this process will suggest themselves to one skilled in the art and the invention is not to be limited to the above examples.

What is claimed is:

1. A method for controlling fungi comprising applying to the locus to be treated a fungicidally effective amount of 3a,4,7,7a - tetrahydro - 2,3,3a,4,5,6,7,7a-octahalo-4,7-methanoindene-1,8-dione diimine, wherein halo is selected from the group consisting of chloro, bromo and mixtures thereof.

2. A method according to claim 1 wherein the diimine employed is 3a,4,7,7a - tetrahydro - 2,3,3a,4,5,6,7,7a-octachloro-4,7-methanoindene-1,8-dione diimine.

3. A method according to claim 1 wherein the diimine employed is 3a,4,7,7a - tetrahydro - 2,3,3a,4,5,6,7,7a-octabromo-4,7-methanoindene-1,8-dione diimine.

4. A method according to claim 1 wherein the locus to be treated is a plant.

5. A method according to claim 4 wherein the diimine is applied in solution in a solvent.

6. A fungicidal composition comprising a fungicidally effective amount of 3a,4,7,7a-tetrahydro-2,3,3a,4,5,6,7,7a-octahalo-4,7-methanoindene-1,8-dione diimine, wherein halo is selected from the group consisting of chloro, bromo and mixtures thereof, and a member of the group consisting of a solvent for the diimine and a solid carrier for the diimine.

7. A composition according to claim 6 wherein the diimine is 3a,4,7,7a - tetrahydro - 2,3,3a,4,5,6,7,7a-octachloro-4,7-methanoindene-1,8-dione diimine.

8. A composition according to claim 6 wherein the diimine is 3a,4,7,7a-tetrahydro-2,3,3a,4,5,6,7,7a-octabromo-4,7-methanoindene-1,8-dione diimine.

References Cited

UNITED STATES PATENTS 3,189,513   6/1965   Calderwood et al. __ 106—15 XR
3,347,684   10/1967   Blair et al. _____ 106—15

ALBERT T. MYERS, *Primary Examiner.*

D. R. MAHANAND, *Assistant Examiner.*